United States Patent
Ashikawa

(10) Patent No.: US 7,187,522 B2
(45) Date of Patent: Mar. 6, 2007

(54) TAPE CASSETTE

(75) Inventor: Teruo Ashikawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 61 days.

(21) Appl. No.: 10/693,894

(22) Filed: Oct. 28, 2003

(65) Prior Publication Data
US 2004/0135020 A1    Jul. 15, 2004

(30) Foreign Application Priority Data
Oct. 30, 2002  (JP) .......................... P.2002-316208

(51) Int. Cl.
G11B 23/02        (2006.01)
(52) U.S. Cl. ..................................... 360/132
(58) Field of Classification Search ............... 360/132; 442/287
See application file for complete search history.

(56) References Cited

U.S. PATENT DOCUMENTS 6,025,286 A * 2/2000 Kawatsu et al. ............ 442/287
6,654,204 B2 * 11/2003 Morita et al. ............... 360/132
6,680,818 B1 * 1/2004 Morita et al. ............... 360/132

FOREIGN PATENT DOCUMENTS

| EP | 0420564 A2 * | 4/1991 |
| EP | 1204114 A1 * | 5/2002 |
| JP | 5-47153 | 2/1993 |
| JP | 7-18068 Y2 | 4/1995 |
| JP | 11-110946 | 4/1999 |
| JP | 2-16479 | 2/2003 |

* cited by examiner

Primary Examiner—Tianjie Chen
(74) Attorney, Agent, or Firm—Sughrue Mion, PLLC

(57) ABSTRACT

A tape cassette wherein, on one of the central upper portion of a reel and a pressure mechanism, there is disposed a center pin, on the other, there is formed a contacting flat plate portion with which the center pin can be contacted, one of the center pin and contacting flat plate portion is molded mainly of polyacetal-system synthetic resin, the other is molded mainly of polybutylene-system or polyethylene-system synthetic resin, and inorganic powder is added to at least one of these two kinds of synthetic resin.

2 Claims, 6 Drawing Sheets

TAPE CASSETTE

BACKGROUND OF THE INVENTION

1. Field of the Invention

The present invention relates to a tape cassette structured such that a reel with a magnetic tape wound thereon is stored in a cassette case.

2. Description of the Related Art

Generally, a tape cassette for use in a videotape recorder and the like is structured such that a reel with a magnetic tape wound thereon is rotatably stored in the interior of a cassette case. In the central lower portion of the reel stored, there is formed an engaging portion which can be engaged with a rotary shaft provided on the reading apparatus side; and, in case where the engaging portion is engaged with the rotary shaft, the reel can be driven and rotated.

Also, on the central upper portion of the reel, there is disposed a semispherical-shaped center pin, and there is disposed a holder including a plane portion to be point contactable with the center pin in such a manner that the holder covers the center pin. The holder is always pressing the reel downwardly through an elastic mechanism and, when the rotary shaft is not connected, the reel receives the pressing force from the holder and thus the rotational movement of the reel is restricted by a stopper disposed on the cassette case side. On the other hand, in case where the reel is connected to the rotary shaft, the rotary shaft raises the reel upwardly against the pressing force to thereby remove the rotation restriction of the reel by the stopper, so that the reel is held so as to be rotatable while the upper side of the reel is supported in a point contact manner. In this state, the reel can be driven and rotated. The above-structured tape cassette is disclosed, for example, in JP-UM-B-7-18068.

By the way, the reel of the above tape cassette is structured such that it rotates while the center pin is point contacted with a pressure mechanism; and, therefore, when the reel rotates, the center pin and holder point contacted with the center pin are both shaved due to the wear thereof to thereby cause the synthetic resin, of which the holder and center pin are made, to generate the powder thereof; and, the synthetic resin powder sticks to a magnetic head to thereby give rise to the dropout of data in the recording and reproducing operations.

Also, the wear of the center pin and holder causes a core which serves as the center of rotation. That is, in case where the above tape cassette is loaded into different reading apparatus or the like and is then driven and rotated, since the rotary shaft positions of the rotary shafts are individually different according to the respective apparatus, due to the restriction of the thus-formed core, the rotary shafts are easy to incline or the centers of the rotary shafts can be easily displaced. As a result of this, the rotation torque of the reel is caused to vary, which results in the uneven rotation of the reel and also in the vibrations of the reel.

In view of the above problems, according to JP-UM-B-7-18068, the center pin and a member to be point contacted with the center pin are both made of resin material having high wear resistance. However, especially in order to meet the need for enhancement of the rotation speed of the reel involved with realization of the increased capacity of the recording capacity in recent years, when the reel is rotated at a high speed, even in case where the center pin and its mating member are made of the above resin material, they wear, thereby raising a similar problem to the above problem. That is, in order to enhance the handling efficiency of the magnetic tape for quick recording and writing data into the magnetic tape, in case where the normal high-speed rotation of the magnetic tape, namely, about 2000 rpm is increased up to about 3000~4000 rpm, wear is easy to occur and, even in the case of slight wear, the rotation torque of the reel is caused to increase, thereby raising a fear that the dropout of data can occur.

SUMMARY OF THE INVENTION

The present invention aims at eliminating the drawbacks found in the above-mentioned tape cassettes. Accordingly, it is an object of the invention to provide a tape cassette which can positively prevent a reel against wear even when it is rotated at a high speed and also can eliminate the generation of sliding resin powder and the vibrations of the reel caused by the wear of the reel.

In attaining the above object, according to the invention as set forth in a first aspect, there is provided a tape cassette comprising: upper and lower half cases of which a cassette case is composed; a reel with a magnetic tape wound thereon being rotatably stored in the cassette case; a pressure mechanism for pressing elastically the central upper portion of the reel, the pressure mechanism being mounted on the upper half case; a center pin being disposed on one of the reel central upper portion and the pressure mechanism; and a flat plate portion contacted by the center pin, the flat plate portion being disposed on the other of the reel central upper portion and the pressure mechanism; wherein one of the center pin and the flat plate portion is molded mainly of polyacetal-system synthetic resin, the other is molded mainly of polybutylene-system or polyethylene-system synthetic resin, and inorganic powder is added to at least one of these two kinds of synthetic resin.

According to the present tape cassette, one of the center pin and flat plate portion to be contacted with each other when the reel rotates is molded mainly of polyacetal-system synthetic resin, the other is molded mainly of polybutylene-system or polyethylene-system synthetic resin, and inorganic powder is added to at least one of the center pin and flat plate portion. Therefore, even in the high speed rotating time of the reel, wear in the contact portion between the center pin and flat plate portion can be restricted properly.

Thanks to this, in a tape cassette of which realization of the high-speed rotation of the reel has been required in recent years, wear can be restricted as much as possible and generation of the dropout of data can be eliminated. Also, generation of the vibrations of the reel caused by the displaced center of the reel due to wear can be prevented.

By the way, in case where the addition amount of the inorganic powder is set in the range of 15~45 weight percent, the reducing effect of the wear amount can be enhanced and use of the excessive amount of the inorganic powder can be avoided, thereby being able to prevent the wear of the reel with high efficiency and at a low cost.

Further, in case where titanium oxide is used as the inorganic powder, the wear preventive effect can be enhanced.

DETAILED DESCRIPTION OF THE INVENTION

Now, description will be given below in detail of an embodiment of a tape cassette according to the invention with reference to the accompanying drawings.

Figure 1:
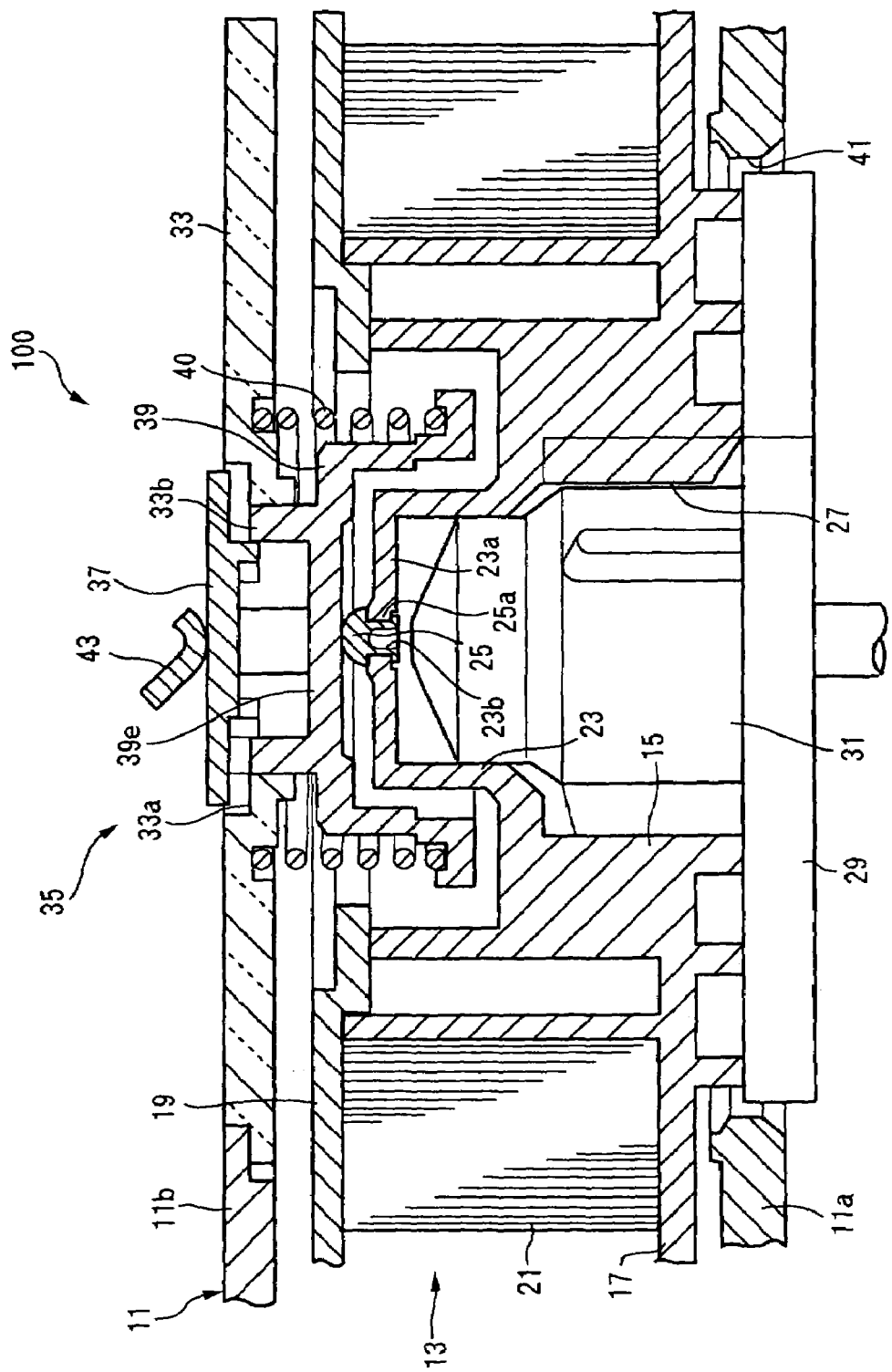
FIG. 1 is a section view of the main portions of a tape cassette according to the invention.
Figure 2:
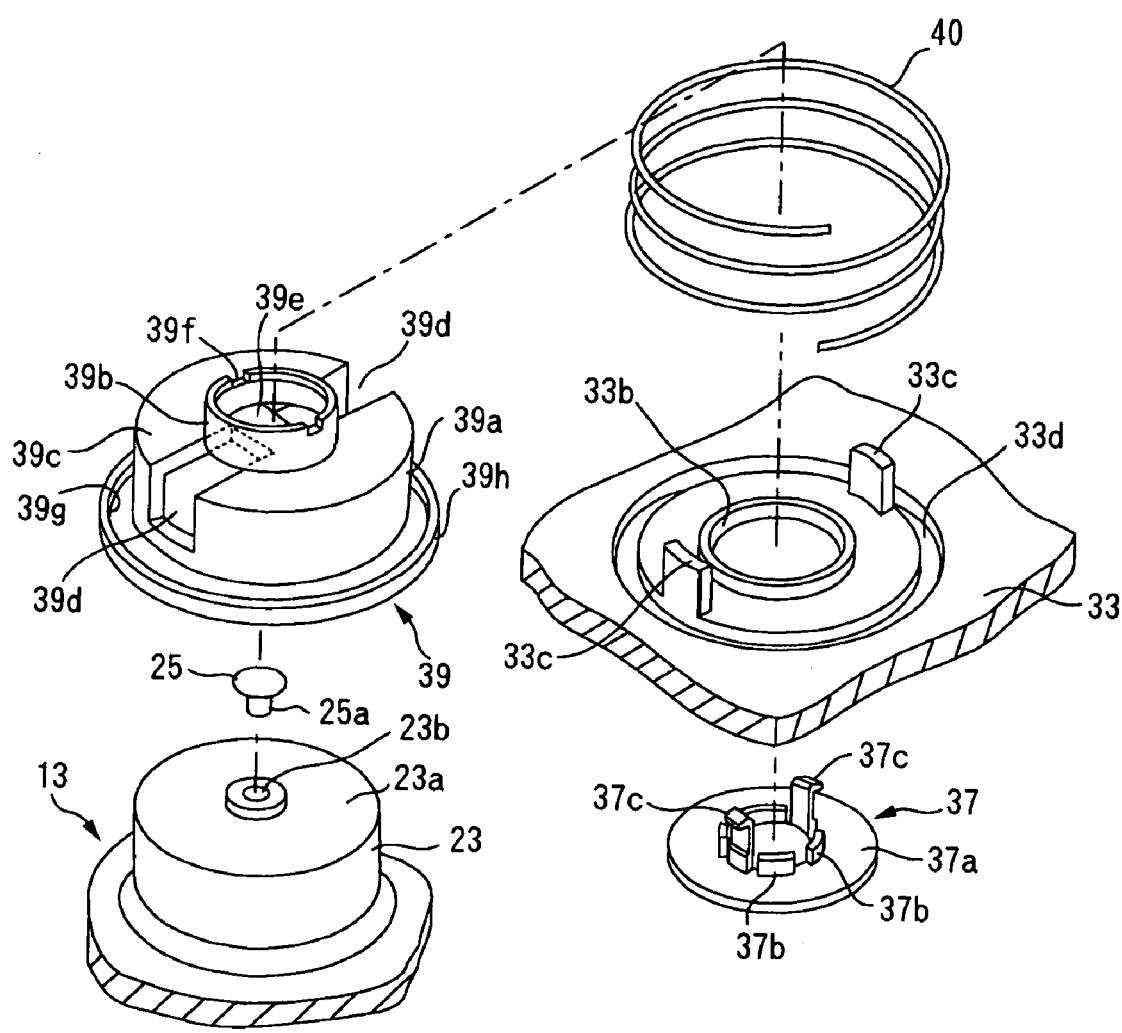
FIG. 2 is an exploded perspective view of a portion of the tape cassette shown in FIG. 1.

FIG. 1 is a section view of the main portions of a tape cassette according to the present embodiment of the invention, and FIG. 2 is an exploded perspective view of a portion of the tape cassette shown in FIG. 1.

As shown in FIG. 1, the tape cassette 100 comprises a reel 13 made of synthetic resin which is rotatably stored in the interior of a cassette case 11 composed of lower and upper half cases (that is, a lower case 11a and an upper case 11b) respectively molded of synthetic resin.

The reel 13 includes a lower flange 17 having a reel hub 15 in the central portion thereof and an upper flange 19 to be connected by welding or by similar means to the upper end portion of the reel hub 15, while a magnetic tape 21 is wound on the reel hub 15. Also, the central upper portion of the reel hub 15 includes a cylindrical portion 23 the upper portion of which is closed by an upper surface plate 23a and, on the central portion of the upper surface plate 23a of the cylindrical portion 23, there is disposed a semi-spherical-shaped center pin 25 molded of synthetic resin. The center pin 25 includes a fitting portion 25a and, by pressure inserting the fitting portion 25a into a fitting hole 23b formed in the upper surface plate 23a of the cylindrical portion 23, the center pin 25 is mounted onto the upper surface plate 25a.

By the way, the center pin 25 is molded of polyacetal-system synthetic resin such as polyacetal or polyoxymethylene.

Also, the reel hub 15 includes an engaging hole 27 in the central lower portion thereof, while the rotary shaft 31 of a reel base 29 disposed on the reading apparatus side can be inserted into and engaged with the securing hole 27.

The upper case 11b constituting the cassette case 11 includes a transparent window plate 33 which is molded of synthetic resin. In the upper surface portion of the window plate 33, there is formed a recessed portion 33a and, in the central portion of the recessed portion 33a, there is formed a penetration hole 33b. In the window plate 33, as shown in FIG. 2, there are disposed a pair of projections 33c at mutually opposing positions on the outside of the penetration hole 33b and, on the outside of the projections 33c, there is formed an annular-shaped groove portion 33d.

Also, a pressure mechanism 35 is mounted on the window plate 33. This pressure mechanism 35 comprises a holder 39 for covering the cylindrical portion 23 of the reel hub 15, an energizing spring 40 to be interposed between the holder 39 and window plate 33, and a cap 37 for fixing the holder 39 to the window plate 33.

By the way, in FIG. 2, the energizing spring 40, window plate 33 and cap 37 are shown in such a manner that their positions are reversed in the vertical direction.

The cap 37 includes a circular plate portion 37a and a plurality of ribs 37b concentrically provided on and erected from the circular plate portion 37a. Of these ribs 37b, a pair of mutually opposing ribs respectively include engaging pieces 37c which are extended perpendicularly from the circular plate portion 37a.

The holder 39 is generally structured such that it includes a large-diameter portion 39a and a small-diameter portion 39b respectively formed in a cylindrical shape and these two portions are connected together by a flat plate portion 39c to thereby provide an integral structure. And, in the large-diameter portion 39a and flat plate portion 39c, there are formed hole portions 39d at symmetrical positions with respect to the centers thereof. Due to these hole portions 39d, in the interior of the small-diameter portion 39b, there is disposed a central flat plate portion 39e which is composed of a portion of the flat plate portion 39c. Also, in the upper end portion of the small-diameter portion 39b, there are formed a pair of cut-away portions 39f and, on the lower end portion of the large-diameter portion 39a, there is disposed a flange 39h including a groove portion 39g.

The holder 39 is molded of composite synthetic resin which is composed of polybutylene-system synthetic resin such as polybutylene terephtalate or polyethylene-system synthetic resin such as polyethylene terephatalate and needle-shaped titanium oxide ($TiO_2$), which is inorganic powder, added to the synthetic resin.

Here, the titanium oxide may be added in the ratio of 15~45 weight percent, preferably, 20~40 weight percent, more preferably, 25~35 weight percent. Also, as an example of polybutylene terephtalate with titanium oxide added thereto, there can be used 6302T with titanium oxide added by 30 weight percent thereto, which is produced by Nippon Polychem Co. Ltd.

To assemble the pressure mechanism 35, firstly, the small-diameter portion 39b of the holder 39 may be inserted into the penetration hole 33b of the window plate 33 from below. At the then time, by fitting the projections 33c of the window plate 33 into the hole portions 39d of the large-diameter portion 39a of the holder 39, the holder 39 can be prevented from rotating with respect to the window plate 33. Also, when inserting the holder 39, the reel energizing spring 40 composed of a compression coil spring is interposed between the groove portion 33d of the window plate 33 and the groove portion 39g of the flange 39h of the large-diameter portion 39a.

Next, the ribs 37b of the cap 37 are fitted into the small-diameter portion 39b of the holder 39 from above the window plate 33 to thereby mount the cap 37 onto the upper end portion of the small-diameter portion 39b. At the then time, the engaging pieces 37c of the cap 37 are respectively inserted into the two-side holes of the contacting flat plate portion 39e of the holder 39 to thereby bring the engaging pieces 37c into engagement with the lower end portion of the small-diameter portion 39b.

As a result of this, the cap 37 and holder 39 are connected to each other and the pressure mechanism 35 including the cap 37 and holder 39 is supported on the window plate 33 in such a manner that it can be moved in the vertical direction. And, the cylindrical portion 23 of the reel 13 is inserted into the large-diameter portion 39a of the holder 39 and the center pin 25 of the reel 13 is contacted with the contacting flat plate portion 39e.

According to the tape cassette 100 including the thus-structured pressure mechanism 35, as shown in FIG. 1, the holder 39 and cap 37 of the pressure mechanism 35 are energized downwardly due to the energizing force of the reel energizing spring 40 and the center pin 25 of the reel 13 is pressed by the contacting flat plate portion 39e, so that the reel 13 is pressed and energized downwardly.

Next, description will be given below of an operation to load the tape cassette 100 having the above structure into an apparatus such as a videotape recorder and carry out recording and writing operations.

In case where the tape cassette 100 is inserted into an apparatus such as a videotape recorder and is loaded at a given position, the rotary shaft 31 is inserted into the engaging hole 27 of the reel 13 and also the reel base 29 including the rotary shaft 31 is inserted into the opening 41 of the lower case 11a. Due to this, the reel 13 is raised upwardly against the energizing force of the reel energizing spring 40 of the pressure mechanism 35.

Also, the upper portion of the cap 37 of the pressure mechanism 35 is pressed by a reel energizing member 43 which is composed of a plate spring disposed on the cassette holder. Due to the pressing force of the reel energizing member 43 and the energizing force of the energizing spring 40, the reel 13 is pressed downwardly, so that the reel 13 is pressed against the reel base 29 in a stable manner.

In a state where the tape cassette 100 is loaded in the apparatus in this manner, in case where operation instructions such as recording, writing, rewinding and fastforwarding operations are executed, the rotary shaft 31 is driven and rotated together with the reel base 29, with the result that reel 13 is rotated and the magnetic tape 21 wound on the reel 13 is thereby driven for traveling. And, in case where the reel 13 is rotated and the magnetic tape 21 is traveled in this manner, the center pin 25 disposed on the central upper portion of the reel 13 is rotated in such a manner that it is point contacted with the contacting flat plate portion 39e of the holder 39 of the pressure mechanism 35.

Here, in the above tape cassette 100, since the holder 39 is molded mainly of polybutylene-system or polyethylene-system synthetic resin and the center pin 25 is molded mainly of polyacetal-system synthetic resin, their mutual wear can be restricted. Also, because the holder 39 is molded by adding titanium oxide, which is inorganic powder, to the synthetic resin for molding the holder 39, the wear resistance thereof is enhanced further, which makes it possible to restrict the mutual wear further.

Figure 3A:
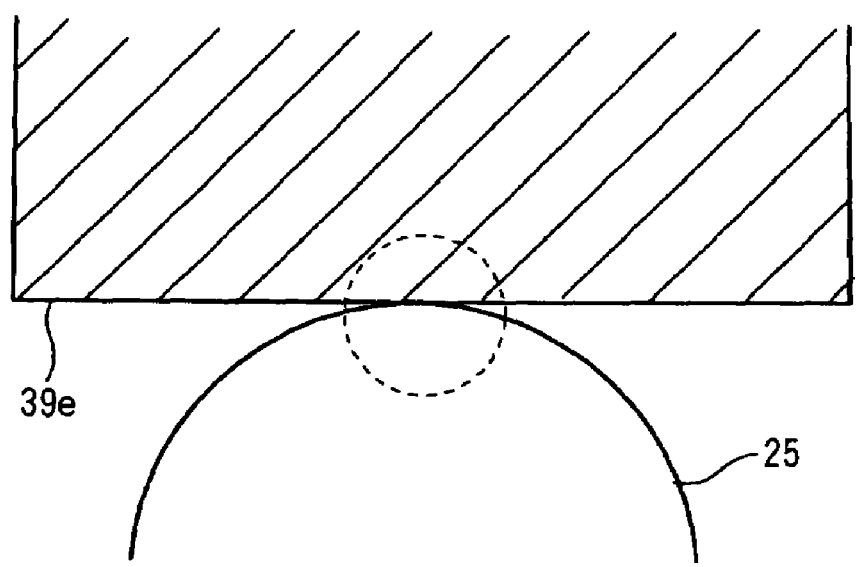
FIGS. 3A and 3B are each a schematic section view of the contacting flat plate portion of a holder and a center pin, explaining typically the contact portion between them.
Figure 3B:
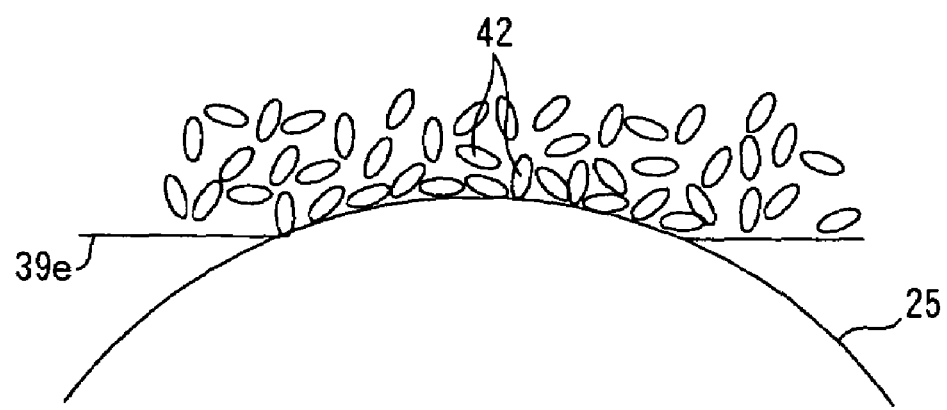

The reason for the above friction restricting effect obtained by addition of the titanium oxide may be as follows. That is, as shown in FIG. 3A, the mutually sliding portion between the center pin 25 and the contacting flat plate portion 39e of the holder 39, when the reel 13 is rotating, it is shaved a very small amount of the order of 2~3 μm in the initial state thereof. Due to this, as shown in FIG. 3B, titanium oxide particles 42 appear on the surface of the sliding portion and, from that time on, the thus-appeared titanium oxide particles 42 and center pin 25 rub against each other, thereby being able to stop the progress of the wear of the polybutylene-system or polyethylene-system synthetic resin of which the holder 39 is molded.

Also, since the center pin 25 is formed as a separate member from the reel 13, no special consideration may be given to the wear resistance of the reel 13 itself. For example, in case where a reel is formed of synthetic resin consisting of a mixture of ABS and polycarbonate or the like, the heat resistance of the reel can be enhanced.

As described above, according to the tape cassette 100, the holder 39 is formed mainly of polybutylene-system or polyethylene-system synthetic resin, the center pin 25 is formed mainly of polyacetal-system synthetic resin, and further, titanium oxide, which is inorganic power, is added to the above synthetic resin in a given ratio. This can restrict greatly the wear in the mutual contact portion between the contacting flat plate portion 39e of the holder 39 and center pin 25 even when the reel is rotated at high speeds. Thanks to this, in the tape cassette 100 of which the high-speed rotation of the reel 13 has been recently required, the wear in the contact portion can be restricted as much as possible and thus the development of the resin powder due to such wear can be prevented, thereby being able to eliminate not only the dropout of data in the recording and reproducing operations but also the vibrations of the reel caused by the center displacement of the reel due to such wear.

By the way, in the above embodiment, the whole of the holder 39 is integrally molded of synthetic resin with titanium oxide added thereto. However, the holder 39 may also be molded in a so called two-color molding manner: that is, synthetic resin with titanium oxide added thereto may be bonded to the surface of the contacting flat plate portion 39e of the holder 39, or only the front surface side of the holder 39 maybe formed of synthetic resin with titanium oxide added thereto. Also, in the above embodiment, titanium oxide is added to the synthetic resin that is used to mold the holder 39. However, titanium oxide may also be added to the synthetic resin that is used to mold the center pin 25, or titanium oxide may also be added to the two kinds of synthetic resin respectively used to mold the holder 39 and center pin 25.

Figure 4:
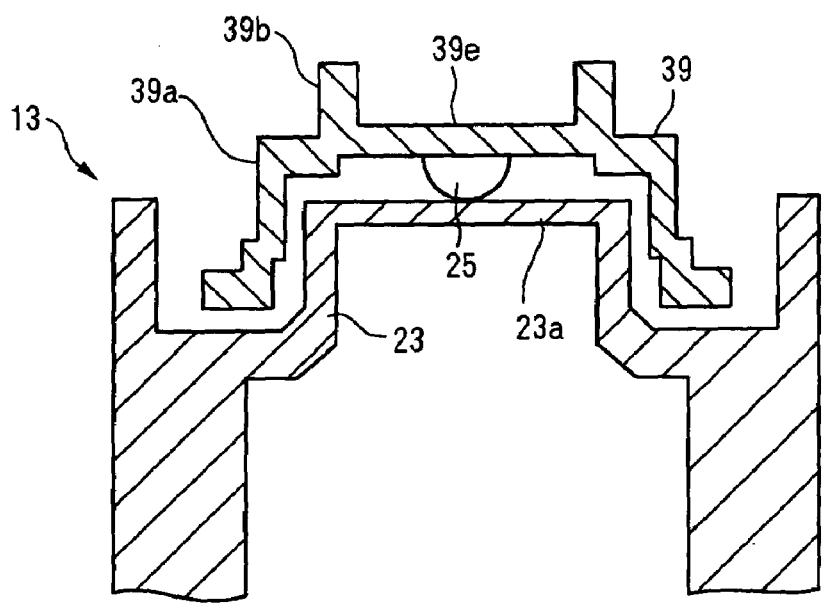
FIG. 4 is an explanatory section view of another example of the contact portion between the contacting flat portion of the holder and the center pin.

Further, in the above embodiment, the center pin 25 is disposed on the reel 13 side, while the center pin 25 can be contacted with the contacting flat plate portion 39e of the holder 39 and can be rotated in a point contact manner. However, it is also possible to employ another structure that, as shown in FIG. 4, the center pin 25 is disposed on the holder 39 side, while the center pin 25 can be contacted with the upper surface plate 23a of the cylindrical portion 23 of the reel 13 and can be rotated in a point contact manner.

By the way, the tape cassette 100 is not limited to a tape cassette of a type that two reels for a videotape are stored therein, but it can also be applied to a tape cassette of a type that one reel 13 is stored therein, provided that the reel 13 with the magnetic tape 21 wound thereon can be rotated.

Also, according to the present embodiment, inorganic powder composed of titanium oxide is added to synthetic resin. However, as the inorganic power to be added, titanium oxide is not limitative but any inorganic powder can be used, provided that it can provide an equivalent effect.

TEST EXAMPLE 1

In this test example, the wear amount of the holder 39 with respect to the addition amount of titanium oxide was measured when, while a given load W was being applied to the holder 39, the reel 13 was driven and rotated at the rotation speed of 4000 rpm for five minutes. As the given load W, actually, there is used a load of 3~4N. However, since this test is a wear acceleration test, the actually used load was increased to 5N.

Figure 5:
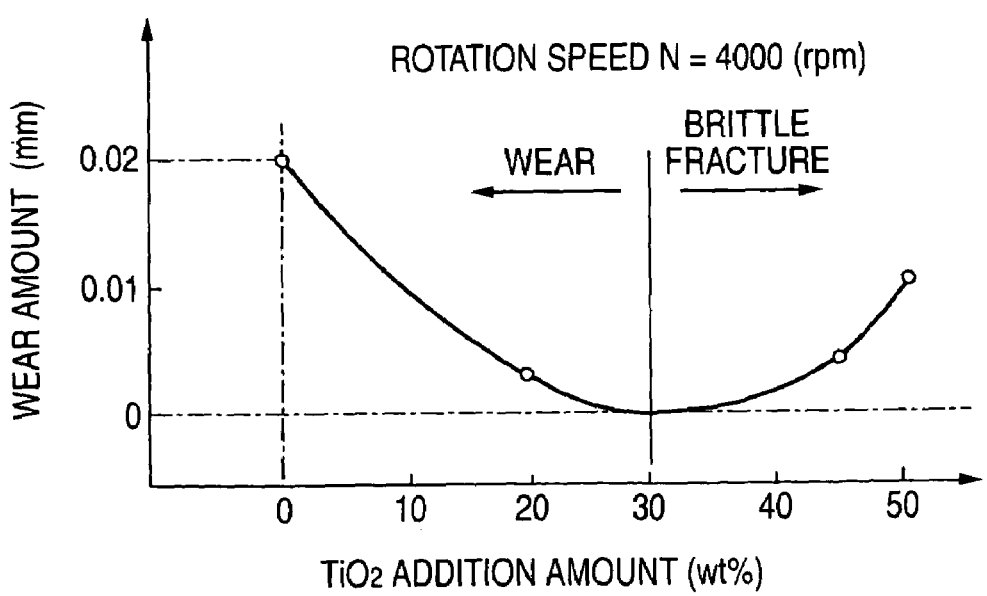
FIG. 5 is a graphical representation of the relationship of the wear amount with respect to the addition amount of titanium oxide.

FIG. 5 is a graphical representation of the results of the test example 1. As shown in FIG. 5, it is found that the holder 39 little wears when the addition amount of titanium oxide is 30 weight percent. Also, in the test example 1, with the 30 weight percent as the boundary value of the titanium oxide addition amount, the wear amount of the holder 39 increased gradually as the addition amount of titanium oxide decreased from the boundary value, while the wear amount also increased gradually as the addition amount of titanium oxide increased from the boundary value.

Here, in case where the addition amount of titanium oxide goes below the 30 weight percent, it is believed that a shaving amount due to the normal wear increases. However, as described above, the wear amount increases even when the addition amount of titanium oxide exceeds the 30 weight percent. The reason for this is believed that an increase in the addition amount of titanium oxide degrades the binding function of the synthetic resin as a binder to thereby cause brittle fracture in the holder synthetic resin such as a crack.

TEST EXAMPLE 2

Figure 6A:
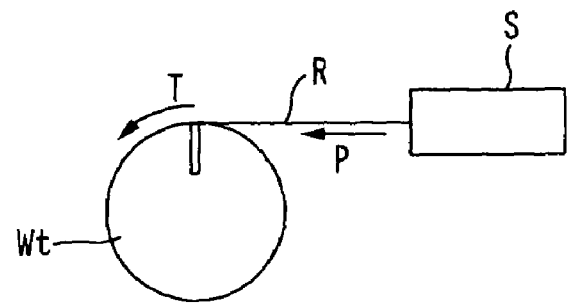
FIGS. 6A and 6B are each a schematic structure view of a measuring jig used to check the wear condition and rotation torque of the sliding portion between the holder and center pin due to the rotation of a reel.
Figure 6B:
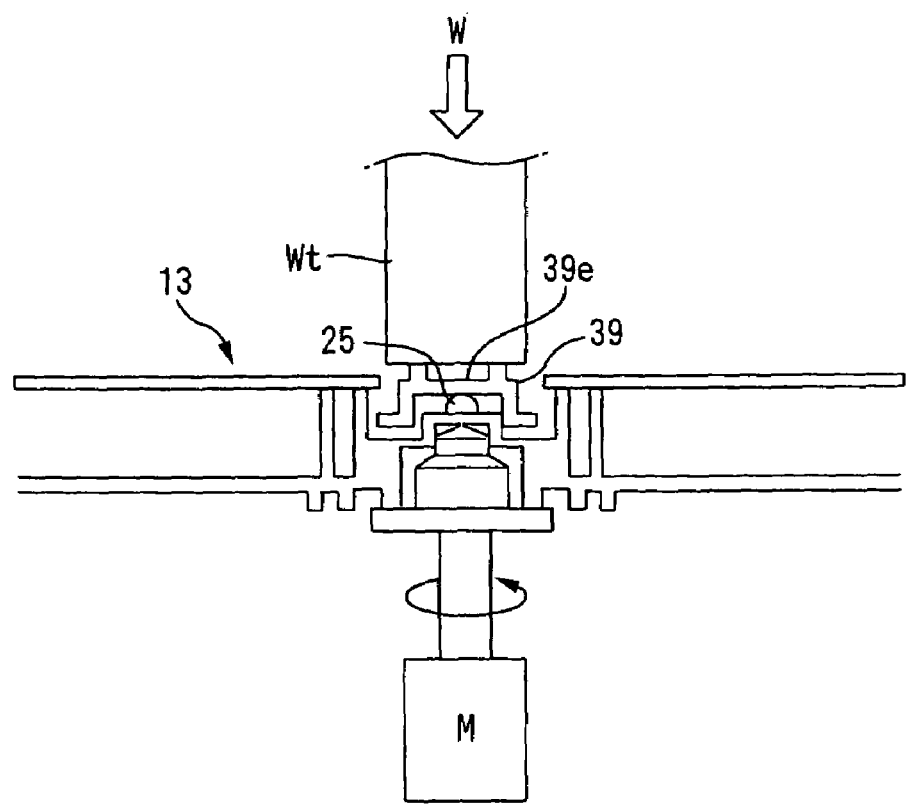

In this test example 2, using such a measuring jig as shown in FIG. 6, the rotation torque and wear amount of the holder 39 were measured. Specifically, as shown in FIG. 6B, a weight Wt was put on the holder 39 to thereby apply a load W of 5 N onto the holder 39 and, in this state, a servo motor M was rotated at various rotation speeds to thereby drive and rotate the reel 13. That is, the then rotation torque and wear amount of the holder 39 were measured. By the way, the rotation torque T was measured in such a manner as shown in FIG. 6A which is a view obtained by viewing FIG. 6B from above: that is, a string R was fixedly secured to the outer periphery of the weight Wt put on the holder 39, and a tensile force P applied to the string R was measured using a load cell S. On the other hand, the wear amount was measured in such a manner that the holder 39 was taken out from the reel 13 and, using a shape measuring device, the sliding portion of the holder 39 was scanned in a contact manner.

The above measurement was made under two conditions: that is, under one condition, the holder 39 was formed by adding 30 wt % of titanium oxide to polybutylene-system synthetic resin; and, under the other condition, the holder 39 was formed of polybutylene-system synthetic resin with no titanium oxide added thereto. The results of these measurements are shown in FIG. 7. Here, FIG. 7A shows torque variations with respect to rotation speeds, while FIG. 7B shows wear amounts with respect to rotation speeds.

Figure 7A:
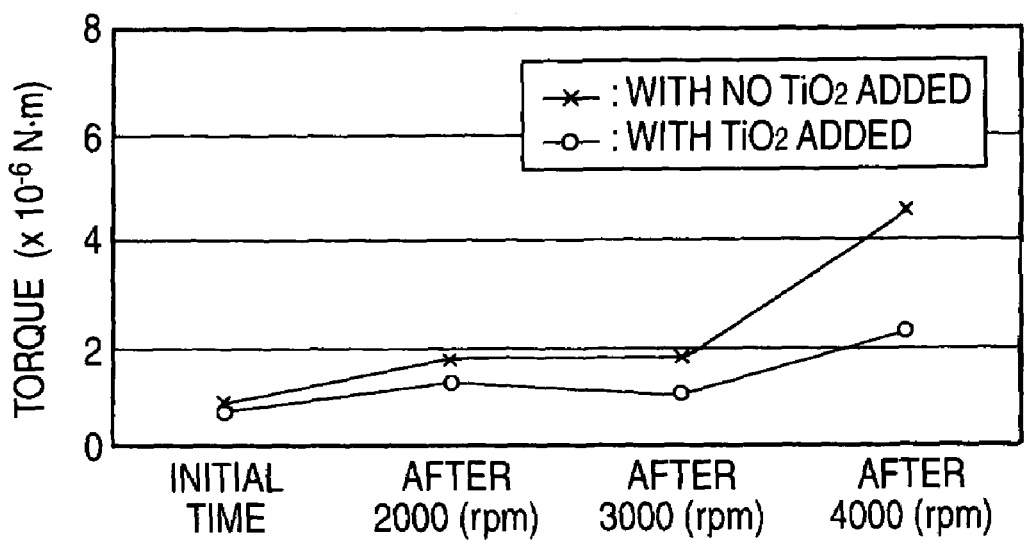
FIGS. 7A and 7B are each a graphical representation of the relationship of the rotation torque and wear amount of the holder with respect to the rotation speed of the reel.

As shown in FIG. 7A, the holder 39 according to the invention with titanium oxide added to the synthetic resin, when compared with the conventional holder with no titanium oxide added, was found substantially at the same level while the rotation torque was slightly low, when the rotation speed was 2000 rpm or 3000 rpm. However, at the rotation speed of 4000 rpm, the rotation torque of the holder according to the invention was greatly reduced over that of the conventional holder.

Figure 7B:
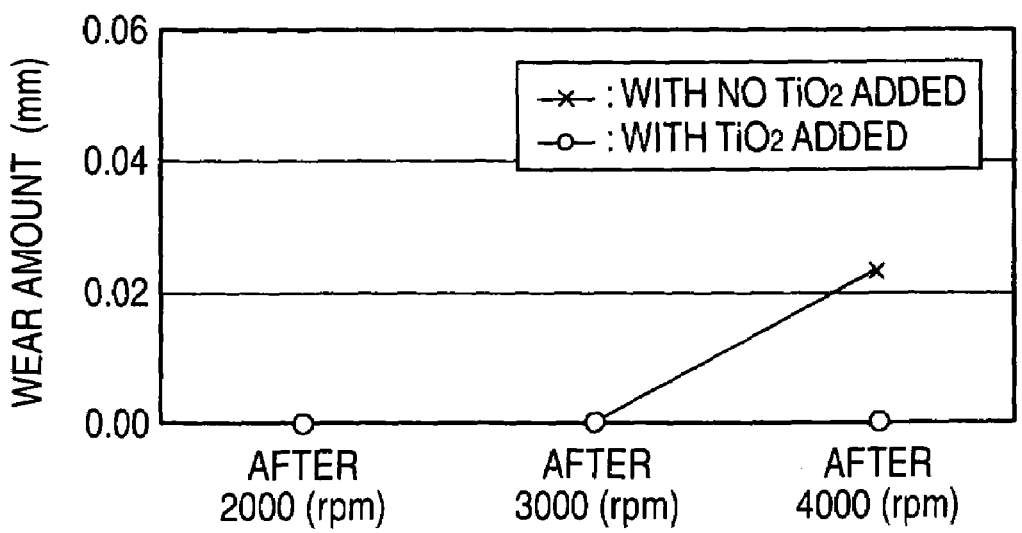

Also, as shown in FIG. 7B, in both of the conventional holder with no titanium oxide added thereto and the holder according to the invention with titanium oxide added thereto, when the rotation speed was 2000 rpm or 3000 rpm, wear was little found. However, when the rotation speed was 4000 rpm, in the conventional holder, the wear amount thereof increased greatly; but, in the holder according to the invention, wear was little found.

According to the tape cassette of the invention, on one of the central upper portion of a reel and a pressure mechanism, there is disposed a center pin, on the other, there is formed a flat plate portion with which the center pin can be contacted, one of the center pin or flat plate portion is molded mainly of polyacetal-system synthetic resin, the other is molded mainly of polybutylene-system or polyethylene-system synthetic resin, and inorganic powder is added to at least one of these two kinds of synthetic resin. Thanks to this, when the reel rotates, the wear in the contact portion between the center pin and flat plate portion contacted with each other can be greatly restricted even in the high-speed rotation of the reel. Due to this, especially in a tape cassette of which enhancement of the rotation speed of the reel is required, wear can be restricted as much as possible to thereby be able to prevent the development of the powder of the synthetic resin that gives rise to the dropout of data in the recording and reproducing operations, which makes it possible to realize high-accuracy recording and reproduction. And, it is also possible to avoid generation of the vibrations of the reel that are caused by the displaced rotation center of the reel due to the above wear.

What is claimed is:

1. A tape cassette comprising:
   upper and lower half cases of which a cassette case is composed;
   a reel with a magnetic tape wound thereon being rotatably stored in the cassette case;
   a pressure mechanism for pressing elastically the central upper portion of the reel, the pressure mechanism being mounted on the upper half case;
   a center pin being disposed on one of the reel central upper portion and the pressure mechanism; and
   a flat plate portion contacted by the center pin, the flat plate portion being disposed on the other of the reel central upper portion and the pressure mechanism;
   wherein one of the center pin and the flat plate portion is molded mainly of polyacetal-system synthetic resin, the other is molded mainly of polybutylene-system or polyethylene-system synthetic resin, and titanium oxide is added to the polybutylene-system or polyethylene-system synthetic resin.

2. The tape cassette as claimed in claim 1, wherein the addition amount of the inorganic powder based on the total amount of the synthetic resin and the inorganic powder is set in the range of 15~45 weight percent.

\* \* \* \* \*